(12) United States Patent
Simske et al.

(10) Patent No.: US 9,977,987 B2
(45) Date of Patent: May 22, 2018

(54) REGION SELECTION FOR COUNTERFEIT DETERMINATIONS

(75) Inventors: Steven J. Simske, Fort Collins, CO (US); Malgorzata M. Sturgill, Fort Collins, CO (US); Matthew D. Gaubatz, Seattle, WA (US); Masoud Zavarehi, Corvallis, OR (US); Paul S. Everest, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 652 days.

(21) Appl. No.: 14/347,254

(22) PCT Filed: Oct. 3, 2011

(86) PCT No.: PCT/US2011/054522
§ 371 (c)(1),
(2), (4) Date: Mar. 26, 2014

(87) PCT Pub. No.: WO2013/052025
PCT Pub. Date: Apr. 11, 2013

(65) Prior Publication Data
US 2016/0342857 A1    Nov. 24, 2016

(51) Int. Cl.
*G06K 9/00* (2006.01)
*G06K 9/46* (2006.01)
(Continued)

(52) U.S. Cl.
CPC ......... *G06K 9/4671* (2013.01); *G06K 9/6231* (2013.01); *G06T 7/11* (2017.01); *G06T 2207/10004* (2013.01)

(58) Field of Classification Search
None
See application file for complete search history.

(56) References Cited

U.S. PATENT DOCUMENTS

| 6,396,941 | B1 * | 5/2002 | Bacus | G01N 1/312 382/128 |
| 7,050,502 | B2 * | 5/2006 | Yasunari | H04N 5/145 348/E5.066 |

(Continued)

FOREIGN PATENT DOCUMENTS

| CN | 101231701 | 7/2008 |
| JP | 2000200352 | 7/2000 |

(Continued)

OTHER PUBLICATIONS

Using the optical mouse sensor—Counterfeit coin detector, Marcel Tresanchez et al., ISSN 1424-8220, 2009, pp. 7083-7096.*

(Continued)

*Primary Examiner* — Jayesh A Patel
(74) *Attorney, Agent, or Firm* — Rathe Lindenbaum LLP

(57) ABSTRACT

A method and apparatus to select from an image (30) of a first sample (28), at least one region (44) digitally captured at a first resolution based upon how a counterfeit identification performance attribute of each region (44) digitally captured at the first resolution correlate to the counterfeit identification performance attribute of the region (44) digitally captured at a second resolution higher than the first resolution. The selected region (44) is used to determine whether the image (30) on a second sample is a counterfeit.

18 Claims, 4 Drawing Sheets

(51) Int. Cl.
*G06K 9/62* (2006.01)
*G06T 7/11* (2017.01)

(56) References Cited

U.S. PATENT DOCUMENTS

| | | | |
|---|---|---|---|
| 7,127,106 B1 | 10/2006 | Neil et al. | |
| 7,209,599 B2* | 4/2007 | Simske | H04N 1/4095 382/274 |
| 7,231,076 B2 | 6/2007 | Fu et al. | |
| 7,272,260 B1* | 9/2007 | Kakiuchi | G06K 9/4609 382/135 |
| 8,164,809 B2* | 4/2012 | Ohkawa | H04N 1/4095 358/1.9 |
| 8,243,333 B2* | 8/2012 | Tamura | H04N 1/4095 358/2.1 |
| 8,923,552 B2* | 12/2014 | Yano | G06K 9/6257 382/103 |
| 2002/0012444 A1 | 1/2002 | Hiromitsu | |
| 2003/0069689 A1* | 4/2003 | Ihara | G01C 21/367 701/455 |
| 2003/0108232 A1 | 6/2003 | Yang | |
| 2004/0136611 A1* | 7/2004 | Reiners | G06K 9/6203 382/291 |
| 2005/0128221 A1* | 6/2005 | Aratani | G06T 3/40 345/619 |
| 2009/0225189 A1 | 9/2009 | Morin | |
| 2009/0245573 A1* | 10/2009 | Saptharishi | G06K 9/00771 382/103 |
| 2010/0037059 A1 | 2/2010 | Sun et al. | |
| 2010/0110298 A1 | 5/2010 | Knee | |
| 2010/0265320 A1 | 10/2010 | Treado et al. | |
| 2011/0194731 A1* | 8/2011 | BenHimane | G06K 9/6211 382/103 |
| 2012/0243796 A1* | 9/2012 | Saito | G06T 5/006 382/218 |
| 2013/0243274 A1* | 9/2013 | Sukegawa | G06K 9/00221 382/118 |
| 2014/0002612 A1* | 1/2014 | Morioka | G03B 35/08 348/46 |
| 2014/0002616 A1* | 1/2014 | Ohba | G06T 7/2086 348/47 |
| 2014/0355892 A1* | 12/2014 | Moon | G06K 9/6215 382/220 |
| 2014/0376770 A1* | 12/2014 | Nister | G06K 9/00536 382/103 |
| 2016/0063734 A1* | 3/2016 | Divakaran | G06K 9/4642 382/110 |
| 2016/0203585 A1* | 7/2016 | Welinder | G06K 9/00979 382/195 |
| 2016/0275367 A1* | 9/2016 | Eliazar | G06K 9/6211 |

FOREIGN PATENT DOCUMENTS

| | | | |
|---|---|---|---|
| JP | 2005267394 | 9/2005 | |
| JP | 4518139 B2 * | 8/2010 | G06K 9/4652 |
| KR | 10-2001-0021850 | 3/2001 | |
| WO | WO-2011005257 | 1/2011 | |

OTHER PUBLICATIONS

Laadjel, M. et al., Palmprint Recongnition Based on Subspace Analysis of Gabor Filter Bank, http://www.igi-global.com/viewtitlesample.aspx?id=47068 (pp. 1-15; vol. 2: Issue: 4), 2010.

* cited by examiner

REGION SELECTION FOR COUNTERFEIT DETERMINATIONS

BACKGROUND

Counterfeiting has become a serious problem for both safety and economic reasons. Counterfeits are sometimes identified by digitally capturing images of labels and comparing such captured images to corresponding authentic images. The capturing of such images and the comparisons used by existing techniques consume large amounts of processing power, transmission bandwidth and memory.

DETAILED DESCRIPTION OF THE EXAMPLES

Figure 1:
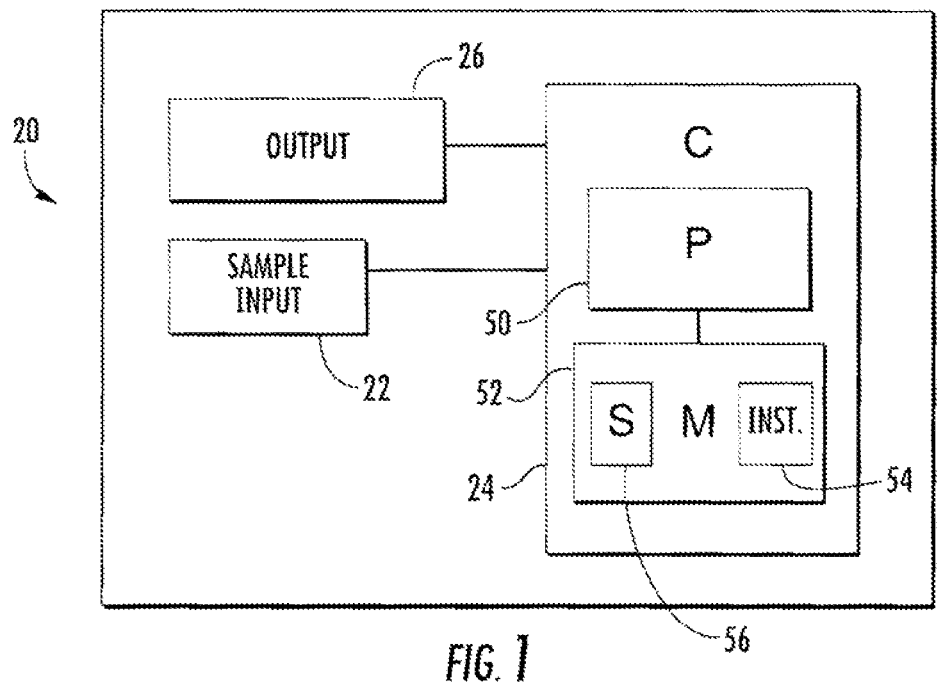
FIG. 1 is a schematic illustration of a counterfeit identification system according to one example.

FIG. 1 schematically illustrates a counterfeit identification system 20 according to one example. As will be described hereafter, counterfeit identification system 20 facilitates the identification of counterfeits using less processing power, less transmission bandwidth or less memory when compared to existing counterfeit identification techniques. Counterfeit identification system 20 comprises sample input 22, computing device 24 and output 26.

Sample input 22 comprises a device configured to provide computing device 24 with digitally captured depictions of samples for which counterfeit identification or determination is desired. According to one example, sample input 22 comprises a digital capture device, such as a digital camera, scanner or other similar device. According to another example, sample input 22 may comprise a communication port, a memory device receiving slot or other data receiving interface to allow computing device 24 to receive such digitally captured depictions of samples.

Figure 2:
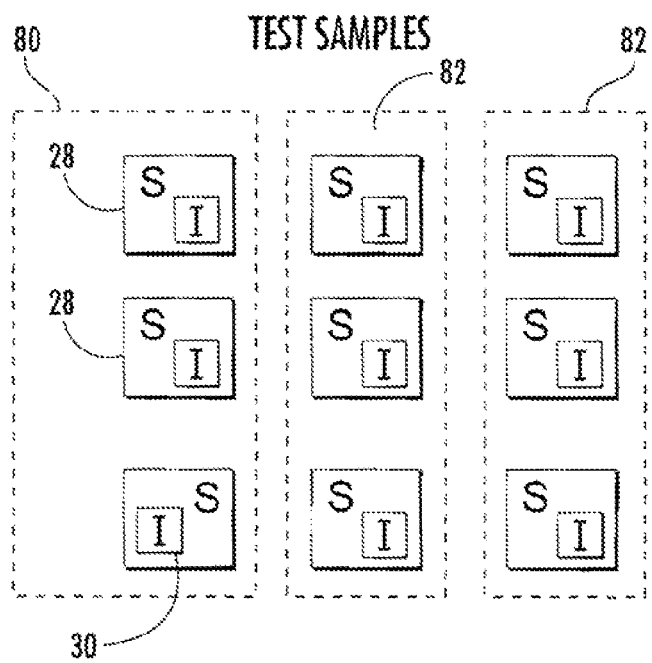
FIG. 2 is a schematic illustration of multiple samples having images using counterfeit determinations.
Figure 3:
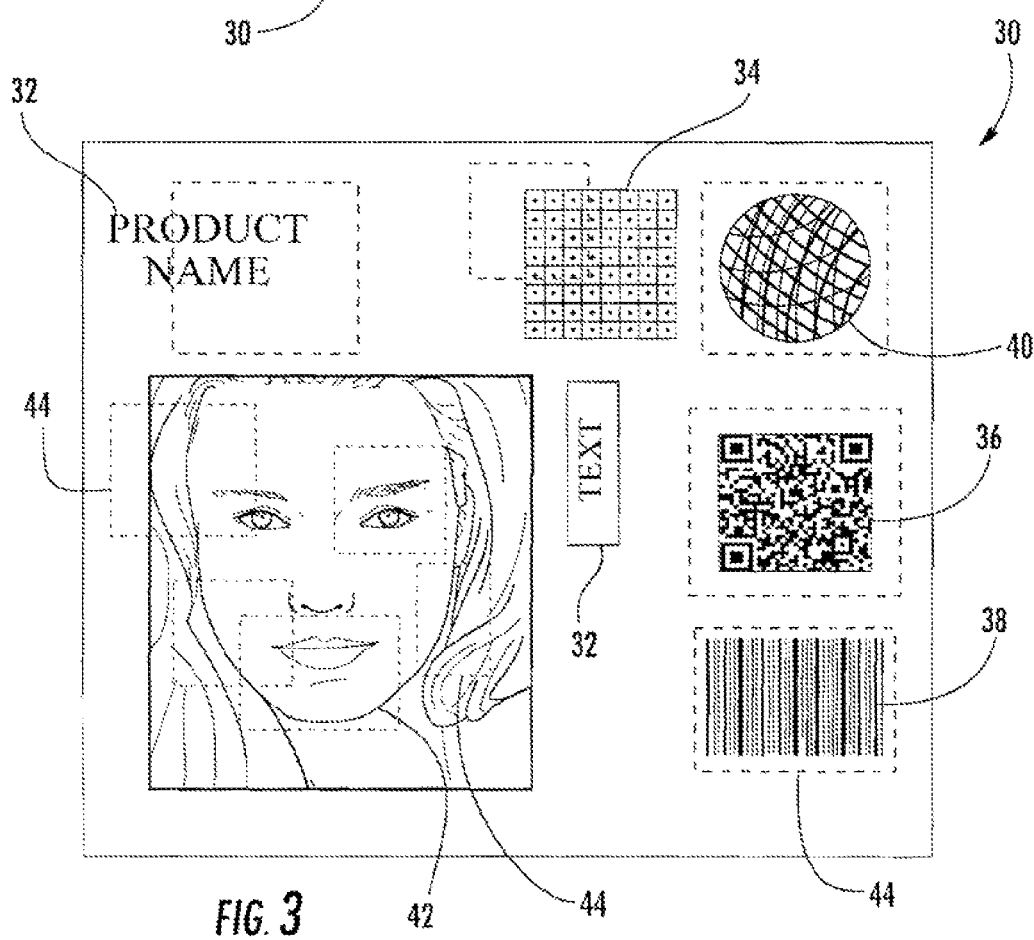
FIG. 3 is an enlarged of an image on each of the samples shown in FIG. 2.

FIG. 2 illustrates examples of samples 28 from which images 30 may be digitally captured and subsequently provided to computing device 24 by sample input 22. FIG. 3 illustrates one example image 30 found on each of samples 28 in one example, image 30 comprises a label adhered to or printed upon the sample product 28. Although images 30 and samples 24 may appear identical to the naked eye, images 30 on some of products or samples 28 may constitute counterfeits. Counterfeit identification system 20 identifies those samples 28 having counterfeit or non-authentic images 30 based upon a quality or characteristic of the digital depiction of at least portions of image 30.

As shown by FIG. 3, each image 30 may include multiple different items which may be used for counterfeit identification. In the example illustrated, image 30 includes areas of text 32, spot colors 34, a color barcode 36, a two-dimensional black-and-white barcode 38, a circular guilloche 40 and a graphic 42 the portrait of a person in the example). The entire area of image 30 includes multiple portions or regions 44, examples of which are enclosed by broken lines. A region 44 may encompass an entire individual item, may encompass a portion of an item, such as a portion of graphic 42, or multiple items. Each of regions 44 may have the same size (the portion of the area of image 30) or may have different sizes. Different regions 44 may partially overlap. Rather than determining whether the associated sample is a counterfeit using the entire image 30, counterfeit identification system 20 makes such a determinations using some, but not all of regions 44. In one example, system 20 may make a counterfeit determination using a single region. In another example, some system(s) 20 may make a counterfeit determination using multiple regions. Because the entire area of region 30 is not used for identifying counterfeits, less processing time and less memory are consumed.

Computing device 24 chooses or selects which of regions 44 are to be used for counterfeit identification. In the example shown, computing device 24 further utilizes a selected region to determine whether a subsequently received digital depiction of the image from a different sample is a counterfeit. Computing device 24 comprises processing unit 50 and persistent storage device or memory 52. Processing units 50 execute series of instructions 54 contained in memories 52. Memories 52 comprise computer-readable-mediums, meaning non-transitory tangible mediums. Memories 52 contain instructions 54. Memories 52 may additionally store data, such as data such as counterfeit analysis thresholds or settings, digital depictions of captured images, prior counterfeit analysis and prior counterfeit results in a data storage portion 56 of memories 52.

Figure 4:
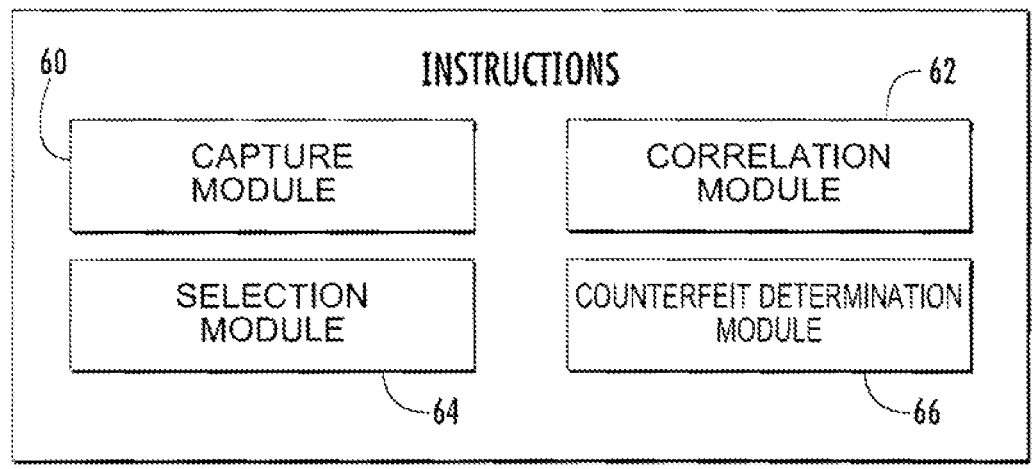
FIG. 4 is schematic illustration of counterfeit identification instructions of a computer readable medium of the system of FIG. 1.

FIG. 4 is a block diagram illustrating the various sections or modules forming the instruction portion 54 of memories 52. As shown by FIG. 4, the instructions contained in memories 52 comprise capture module 60, correlation module 62, selection module 64 and counterfeit determination module 66. Capture module 60, correlation module 62, selection module 64 and counterfeit determination module 66 direct processing, units 50 to carry out method 100 shown in FIG. 5.

Capture module 60 of instructions 54 directs processing units 50 to obtain digitally captured depictions of regions 44 (shown in FIG. 3) at a first resolution. According to one example, capture module 60 directs processing units 50 to control a digital capture device to capture the digital depictions of regions 44 at the first resolution. In one example, the entire image 30 is initially captured, wherein a particular region 44 is cropped from the image 30. In another example, the particular region 44 is initially captured without the remaining areas of image 30. According to another example, capture module 60 requests and obtains digital depictions of regions 44 at the first resolution from another memory.

Figure 5:
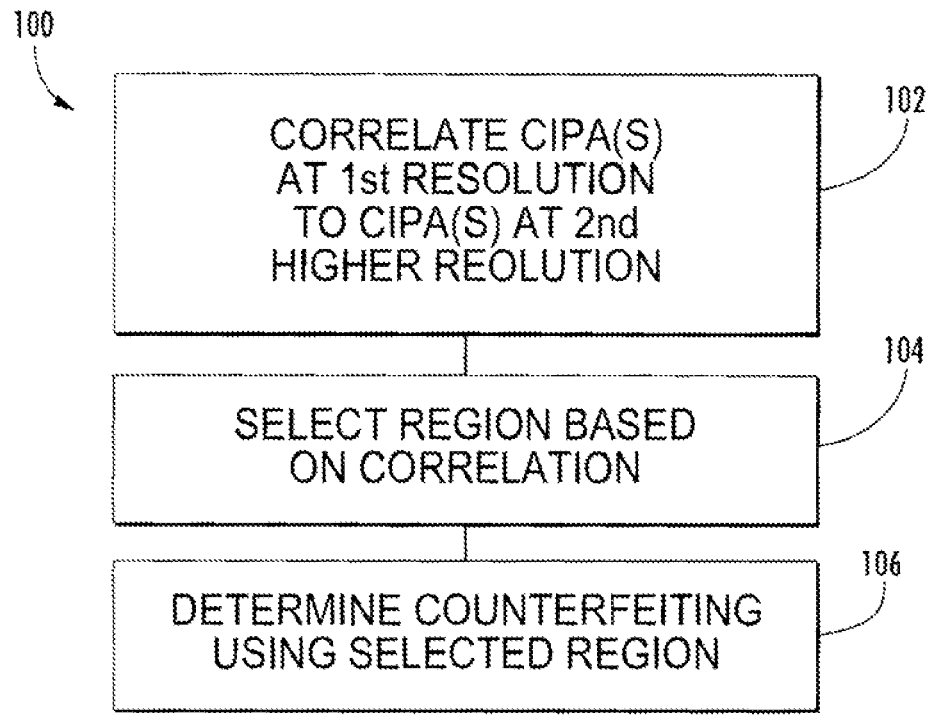
FIG. 5 is a flow diagram of an example method for selecting a region and determining counterfeiting.

Correlation module 62 of instructions 54 directs processing units 50 to carry out step 102 of method 100 shown in FIG. 5. In particular, correlation module 62 compares and correlates at least one counterfeit identification performance attribute (CIPA) of each region 44 captured at the first resolution to the same CIPA of the same region 44 captured at a second resolution higher than the first resolution. In other words, correlation module 62 determines whether counterfeit identification performance drops off significantly when a lower resolution of a region is used as compared to when a higher resolution of the same region is used.

Examples of counterfeit identification performance attributes include, but are not limited to, counterfeit identification accuracy, clustering accuracy and clustering behavior. Counterfeit identification accuracy refers to how well analysis of a particular region 44 using a predetermined set of criteria performs at identifying actual counterfeit images 30 while avoiding false positives-incorrectly identifying authentic images 30 as counterfeits. In some circumstances, no training data or ground truth may be available. In such circumstances, a predictive approach may be taken. Under the predictive approach, historical data is used to identify particular image features, such as image entropy, variance, uniformity of the FFT coefficients across a given range and the like, the statistics of which (mean, variance, skew, kurtosis, range, etc.) historically provide counterfeit accuracy. Correlation module 62 compares and identify features of those regions 44 captured at the first resolution which best match or correlate to the same historical predictive image features of those regions 44 captured at the second higher resolution.

Clustering accuracy refers to how well analysis of a particular region 44 using a predetermined set of criteria performs at grouping images 30 derived from the same source. Such clustering analysis identities those samples 28 which are suspected to originate from the same source. Such clustering (aggregating of related images) identifies sets of samples that should be examined in greater detail and may be used to determine the relative size of each potential counterfeit source. As a result, system 20 identifies those samples 28 or groups of samples 28 which likely originated from larger counterfeiting operations, allowing counterfeit enforcement resources to be better focused on larger counterfeiters.

By way of example shown in FIG. 2, the test samples 28 may include a first group 80 of samples 28 which are pre-identified as being authentic (the "ground truth"), a second group 82 of samples 28 pre-identified as being counterfeit and originating from a first source, and a third group 84 of samples 28 pre-identified as being counterfeit and originating from a second source. Clustering and in this case also "classification") accuracy refers to how well analysis of a particular region 44 using a predetermined set of criteria performs at correctly grouping images 30 in each of group 80, 82 and 84 together. Examples of techniques that may be used to aggregate or cluster the images 30 of samples 28 using at least one of the below noted metrics or image features from region 44 of each of images 30 include, but are not limited to, k-means clustering and k-nearest neighbor classification after clustering.

Clustering behavior refers to how closely the clustering or aggregation of images 30 using a particular region 44 at the first resolution using a predetermined set of criteria matches the clustering or aggregation of the same images using the same region at the second resolution. By way of the example shown in FIG. 2, clustering behavior refers to the similarity between the groupings of samples 28 (or their images 30) resulting from the use of a particular region at the first resolution and the grouping of samples 28 (or their images 30) resulting from the use of the same region at the second resolution. Determining cluster behavior may be performed (relatively) without ground truth or training data (samples pre-identified as belonging to the same group or originating from the same source).

Examples of features or metrics that may be used to identify a counterfeit sample 28 from an authentic sample 28 or to cluster or aggregate samples 28 include, but are not limited to: R (red) channel, G (green) channel, B (blue) Channel, Cyan, $C=(G+B-R+255)/3$ channel, Magenta, $M=(R+B-G=256)/3$ channel, Yellow, $Y=(R+G-B+255)/3$ channel, Hue, Saturation=max $(RGB)*(1-min(RGB)/sum (RGB))$, Intensity=$(R+G+B)/3$ and pixel variance ("edge space"), the latter which can be, in one simple implementation, defined as the mean difference (in intensity) between a pixel and its four diagonally closest neighboring pixels. In addition, histogram metrics, such as Mean, Entropy, StdDev (standard deviation), Variance, Kurtosis, Pearson Skew, Moment Skew, 5% Point (value indexing histogram below which 5% of histogram light), 95% Point (value indexing histogram below which 95% of these lies) and 5% to 95% Span, may be used. Projection profile metrics which may be used include Entropy, StdDev, Delta StdDev, Mean, Mean Longest Run, Kurtosis, Skew, Moment Skew, Delta Kurtosis, Delta Pearson Skew, Delta Moment Skew, Lines Per Inch, Graininess, Pct (percentage) In Peak, Delta Mean. For the "Delta" metrics, the difference between consecutive profiles of the projection date are used as the primary statistics.

Selection module 64 of instructions 54 (shown in FIG. 4) utilizes the results of correlation module 62 to choose or select which region 44 should be subsequently captured and utilized for identifying counterfeit samples 28 from the general population. Selection module 64 causes processing units 50 to carry out step 104 of method 100 shown in FIG. 5. In particular, selection module 64 selects a region 44 based upon how well the use of the particular region captured at the first resolution performed with respect to a counterfeit identification performance attribute as compared to use of the same particular region captured at the second higher resolution.

According to one example, selection module 64 compares the correlation results for each of a plurality of candidate regions 44 and then selects or chooses those candidate regions having the highest degree of correlation between the results front use of the first resolution of the region 44 and from use of the second higher resolution of the same region 44. For example, selection module 64 may select the one or two regions 44 that exhibit clustering accuracy or clustering behavior at low resolutions most closely matching clustering accuracy or clustering behavior at high resolutions.

According to another example, selection module 64 may select those regions 44 having correlations (the degree to which the results from using region 44 captured at the first resolution match the results from using region 44 captured at the second resolution) that satisfy a predetermined threshold. The predetermined threshold may be a percentage obtained through training/historical/expert input data. In one example, processing units 50 may receive a stream of correlation scores for different candidate regions 44, wherein selection module 64 selects a first region 44 or a first predefined number regions 44 that satisfy the predetermined threshold.

According to one example, the first resolution is a "low" resolution, such as a resolution less than 600 dpi, whereas the second resolution is a "high" resolution of at least 600 dpi. In one example, the "low" resolution and the "high" resolution are predefined and static. According to another example, the first resolution or "low" resolution may be variable. In one example, capture module 60, correlation module 62 and selection module 64 may cooperate to select the first resolution. In particular, instructions 54 may direct processing units 50 to carry out the method 120 shown in FIG. 6. As indicated by step 122, capture module 60 may direct processing units 50 to capture a region 44 at a plurality of different resolutions using input 22. Correlation module 62 may direct processing units 50 to compare and correlate at least one counterfeit identification performance attribute (CIPA) of each region 44 captured at each first candidate resolution to the same CIPA of the same region 44 captured at the second resolution higher than the first candidate resolution. In other words, correlation module 62 determines whether counterfeit identification performance drops off significantly if a lower resolution of the region 44 is used as compared to when a higher resolution of the region is used. Selection module 64 utilizes the results from correlation module 62 to select the lowest candidate resolution that still results in the CIPA of the region 44 sufficiently matching or correlating to the CIPA of the region 44 at the higher resolution. For example, pursuant to method 120, computing device 24 (shown in FIG. 1) may capture a region 44 at each of a plurality of candidate resolutions (e.g., 300 dpi, 225 dpi, 150 dpi, 75 dpi and 25 dpi). For each of such candidate resolutions, correlation module 62 determines a CIPA for the particular region 44 and compares the values for the CIPA to the values for the same CIPA region 44 at the second higher resolution (i.e. at least 600 dpi).

Figure 6:
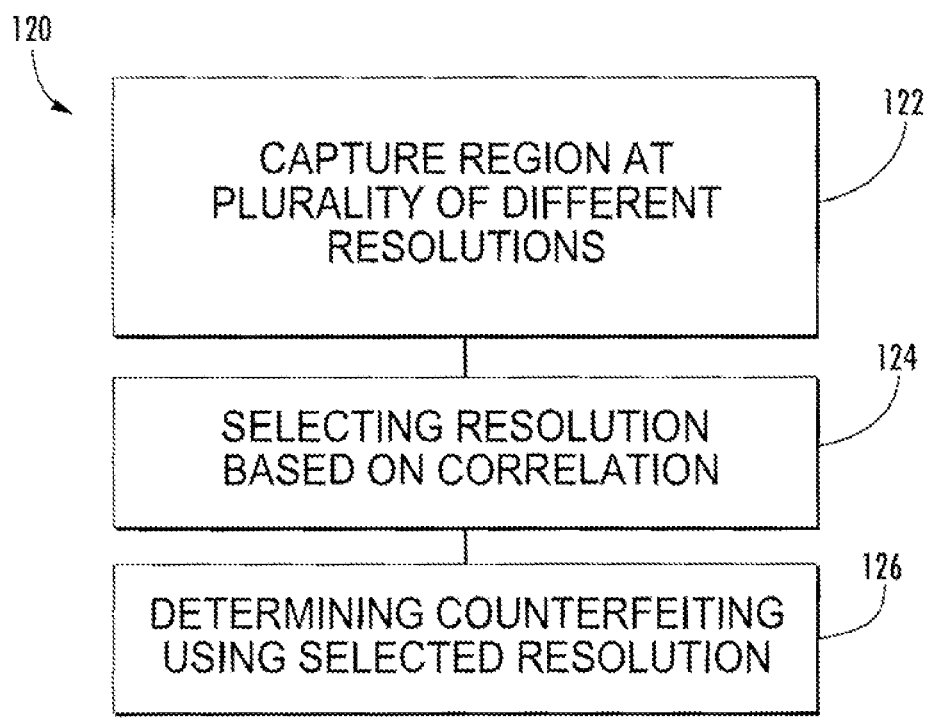
FIG. 6 is a flow diagram of an example method for selecting a resolution and determining counterfeiting.

As indicated by step 124 shown in FIG. 6, selection module 64 would then select one of the candidate resolutions. In one example, this selection may be based upon factors such as memory and processing savings using a lower resolution versus the drop in correlation with the lower resolution. The resolution may be selected based upon whether the correlation at the particular candidate resolution satisfies or meets some predefined threshold or criteria.

As indicated in step 126, the selected resolution is later utilized as part of a counterfeit identification process. According to one example, the resolution is selected prior to the selection of a particular region 44 pursuant to step 104 in method 100 shown in FIG. 5. In such an example, nominal region 44 (randomly chosen or chosen based on other criteria) is utilized to carry out method 120 to identify or select the lowest satisfactory resolution. The selected resolution is then utilized to early out steps 102 and 104 in method 100.

According to another example, the resolution is selected after the particular region 44 is identified in step 104 of method 100. In such an example, a nominal first resolution is chosen and utilized to identify a particular region 44. Once a particular region 44 is identified pursuant to step 104, the selected region 44 is captured at each of the plurality of candidate resolutions, wherein selected region at the chosen resolution (step 124) is then used for subsequent counterfeit determinations.

As shown by FIG. 4, counterfeit determination module 66 directs processing units 50 to later determine whether a sample 28 from the general population constitutes a counterfeit based upon an analysis of the image 30 or, more particularly, the selected region 44 of image 30. Counterfeit determination module 66 carries out step 106 of method 100 shown in FIG. 5. In those examples where the first lower resolution is itself chosen pursuant to step 120, counterfeit determination module 66 utilizes the chosen first resolution (step 126 shown in FIG. 6).

In one example, if the CIPA of the selected region 44 is sufficiently high (sufficiently accurate or otherwise satisfactory), the selected region 44 of the sample 28 being examined for counterfeiting is captured at the first resolution (the nominal first resolution or the selected first resolution pursuant to method 120) and analyzed to determine if the sample 28 is a counterfeit or to determine whether the sample 28 may be grouped or clustered with other samples 28 from the general population. Alternatively, although the candidate regions 44 captured at the first resolution are utilized to select a particular region 44 for use in counterfeit analysis of samples from the general population, such counterfeit analysis of samples 28 from the general population or grouping/clustering of samples 28 from the general population are performed using the selected region or regions captured at the second higher resolution.

The results of the counterfeit determinations are then presented by computing system 24 using output 226. Output 226 comprises a device configured to report the counterfeit determinations. In one example, output 226 may comprise a monitor or display screen. In another example, output 226 may comprise a printing device. In still other examples, other output mechanisms or devices may be utilized to provide the counterfeit determination results such as whether or not a particular sample 28 is a counterfeit or whether or not a particular counterfeit sample originated from a source from which other counterfeit samples originated.

As discussed above, counterfeit identification system 20 selects region 44 from a larger number of regions 44 for use in subsequent counterfeit determinations. Because a portion of the overall area of image 30 is used, rather than the entire area of image 30, less processing power and less storage space are consumed. Because the selection of the particular region 44 or regions 44 for use in subsequent counterfeit determinations is made using digital depictions at lower resolutions, processing, power and storage space is conserved. In one example, the specific resolution used for either selecting the region 44 for subsequent counterfeit determinations or the specific resolution used for making the actual counterfeit determinations is itself chosen based upon the extent to which the CIPA at the lower resolution corresponds to the CIPA at a higher resolution. As a result, the resolution used may be reduced to further reduce processing speed and storage space while avoiding unacceptable sacrifices in performance or accuracy.

Figure 7:
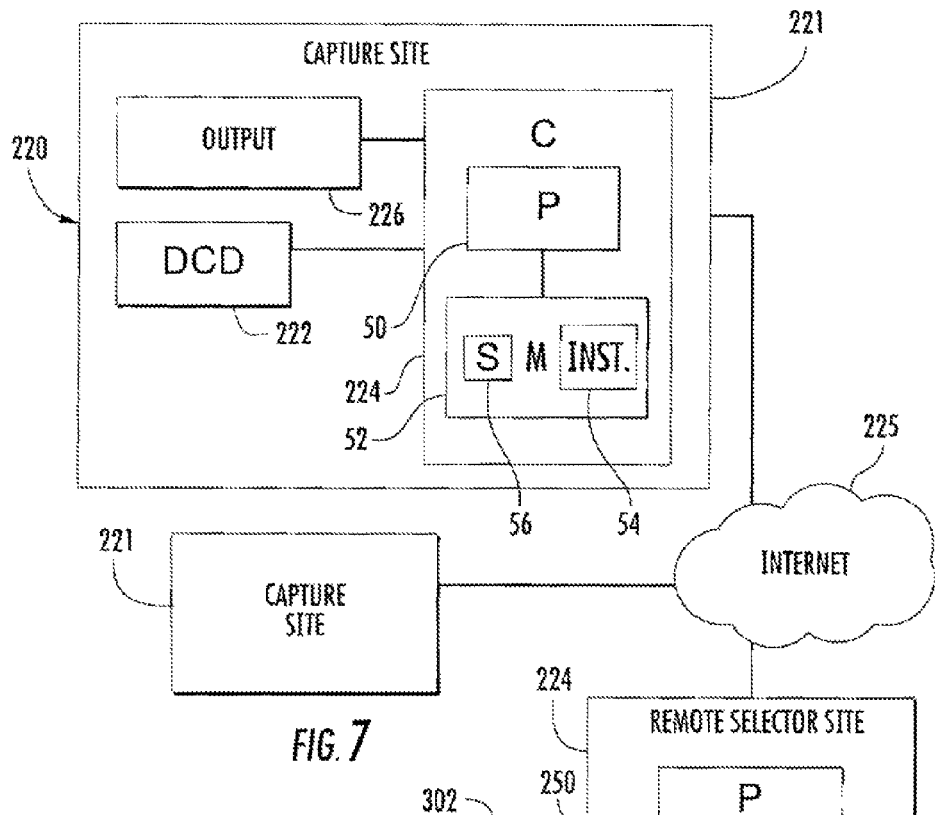
FIG. 7 is a schematic illustration of another example of the counterfeit identification system of FIG. 1.

FIG. 7 schematically illustrates counterfeit identification system 220, another example of counterfeit identification system 20. Counterfeit identification system 220 takes advantage of the smaller size/lower resolution of the captured candidate regions 44. In particular, counterfeit identification system 220 facilitates the capture of regions 44 of images 30 at a local capture site 221 and the determination at a remote selector site 224 (for example, a cloud computer) of which region 44 or subset of regions 44 should be used for counterfeit determinations.

As shown by FIG. 7, each capture site 221 includes a digital capture device 222, a computing device 224 and an output 226. Digital capture device comprises a device to capture a digital rendering or digital depiction of at least a region 44 of an image 30 of sample 28. Examples of digital capture device include, but are not limited to, a digital camera and a scanner.

Computing device 224 is similar to computing device 24 shown and described above with respect to FIG. 1. In the example illustrated, like computing device 24, computing device 224 includes local instructions 54 for selecting a region 44 or a subset of regions 44 based upon how a CIPA of a region captured at a first resolution match or correlate to the same CIPA of the region captured at a second higher resolution. In the example illustrated, counterfeit identification system 220 is operable in two available modes selectable by a person or user of system 220. In the first mode, computing system 224 locally selects region 44. In the second mode, computing system 224 transmits the images 30 or regions 44 captured at the first lower resolution to remote selector site 224. In alternatives where system 220 does not locally select a region 44 or a subset of regions 44, but relies upon all such selections being made at remote selector site 224, correlation module 62 and selection module 64 of instructions 54 may be omitted.

Remote selector site 224 is in communication with each of capture sites 221 via a network, such as Internet 225. Remote selector site 224 receives images 30 or regions 44 captured at the first lower resolution and selects or identifies the particular region 44 to be used at the local capture sites 221 for subsequent counterfeit determinations.

Remote selector site 224 comprises a processing unit 250 and a persistent storage device or memory 252. Processing unit 250 is identical to processing unit 50. Memory 252 is similar to memory 52 except that memory 252 includes instructions 254 in place of instructions 54. Instructions 254 are similar to instructions 54 except that instructions 254 omit capture module 60 and counterfeit module 66 (since the capturing and the counterfeit determination are performed at the local capture sites 221). Similar to instructions 54, instructions 254 includes correlation module 62 and selection module 64.

According to a first example, correlation module 62 and selection module 64 cooperate to select a region 44 or a set of regions 44 of an image 30 for subsequent counterfeit determinations using regions 44 of an image 30 captured at the first lower resolution and received from a single capture site 221. According to a second example, correlation module 62 and selection module 64 of computing device 224 cooperate to select a region 44 or a set of regions 44 of an image 30 for subsequent counterfeit determinations using regions 44 of an image 30 captured at the first lower resolution and received from multiple capture sites 221. By using captured regions 44 from a plurality of different capture sites 221, system 220 may select regions 44 better suited to identify counterfeit across a larger geographical region.

Figure 8:
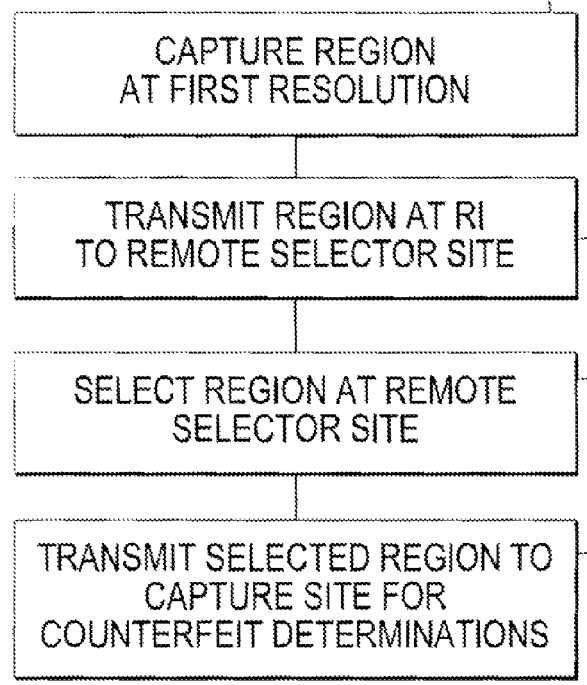
FIG. 8 is a flow diagram of an example method for selecting a region for counterfeit determinations.

FIG. 8 is a flow diagram illustrating a counterfeit identification method 300 which may be carried out by system 220. As indicated by step 302, at least one local capture site 221 captures regions 44 at a first lower resolution. As indicated by step 304, the region 44 captured at the first lower resolution is transmitted to the remote selector site 224. As indicated by step 306, the remote selector site 224 selects a single region 44 or a subset of regions 44 from the total number of regions 44 for use in subsequent counterfeit determinations at capture site 221 filing steps 102104 described above with respect to FIG. 5. As indicated by step 308, remote selector site 224 transmits the selected region 44 or subset of regions 44 to the capture site 221 for subsequent determinations of whether samples 28 from the general population are counterfeits.

Although the present disclosure has been described with reference to example examples, workers skilled in the art will recognize that changes may be made in form and detail without departing from the spirit and scope of the claimed subject matter. For example, although different examples may have been described as including features providing benefits, it is contemplated that the described features may be interchanged with one another or alternatively be combined with one another in the described examples or in other alternative examples. Because the technology of the present disclosure is relatively complex, not all changes in the technology are foreseeable. The present disclosure described with reference to the examples and set forth in the following claims is manifestly intended to be as broad as possible. For example, unless specifically otherwise noted, the claims reciting a single particular element also encompass a plurality of such particular elements.

What is claimed is:

1. A method comprising:
   determining, by a processor, a first correlation result from a comparison of a first counterfeit identification performance attribute (CIPA) pertaining to a first region of an image on a first sample captured at a first resolution and a second CIPA pertaining to the first region captured at a second resolution;
   determining, by the processor, a second correlation result from a comparison of a third CIPA pertaining to a second region of the image on the first sample captured at the first resolution and a fourth CIPA pertaining to the second region captured at the second resolution;
   identifying, by the processor, which of the first correlation result and the second correlation result corresponds to a higher degree of correlation;
   selecting, by the processor and based upon the identification, one of the first region and the second region for use in determining whether an image on a second sample is a counterfeit;
   accessing, by the processor, the image on the second sample, the image on the second sample including a first matching region that corresponds to the first region in the image on the first sample and a second matching region that corresponds to the second region in the image on the first sample; and
   determining, by the processor, whether the image on the second sample is a counterfeit based upon an analysis of the one of the first matching region and the second matching region that corresponds to the selected one of the first region and the second region.

2. The method of claim 1, wherein the second resolution is higher than the first resolution.

3. The method of claim 1, further comprising:
   determining a plurality of correlation results corresponding to multiple regions of the image on the first sample, wherein the multiple regions include the first region and the second region;
   identifying correlation results of the plurality of correlation results that satisfy a predefined threshold; and
   selecting the first region and the second region from the regions corresponding to the identified correlation results that satisfy the predefined threshold.

4. The method of claim 1, wherein the first CIPA and the second CIPA each comprises clustering accuracy.

5. The method of claim 1, wherein the first CIPA and the second CIPA each comprises clustering behavior.

6. The method of claim 1, wherein determining whether the image on the second sample is a counterfeit further comprises
   determining whether the image on the second sample is a counterfeit without performing an analysis on the other one of the first matching region and the second matching region.

7. The method of claim 1, further comprising:
   digitally capturing the first region of the image on the first sample at a plurality of different first resolutions;
   digitally capturing the first region of the image on the second sample using a selected one of the plurality of first resolutions; and
   determining whether the image on the second sample is a counterfeit using the digitally captured first region of the second sample at a selected one of the plurality of first resolutions.

8. The method of claim 1 further comprising:

digitally capturing at the first resolution, the first region at a capture site;
transmitting the first region captured at the first resolution from the capture site to a remote region selector site;
selecting the first region at the remote region selector site; and
transmitting the selected first region to the capture site for use in determining whether an image on a second sample is a counterfeit.

9. A method comprising:
capturing, by a processor and at a first resolution, a plurality of regions of an image from a first sample;
capturing, by the processor and at a second resolution higher than the first resolution, the plurality of regions of the image from the first sample;
determining, by the processor, correlation results for each of the plurality of regions, wherein each of the correlation results is based upon a comparison of counterfeit identification performance attributes (CIPAs) determined at the first resolution and the second resolution for a region;
selecting, by the processor, at least one of the plurality of regions, the selected at least one of the plurality of regions being used in determining whether an image from a second sample is a counterfeit based on a comparison of the correlation results;
capturing a corresponding selected at least one region of the image from the second sample;
accessing, by the processor, the image from the second sample, the image from the second sample potentially being a counterfeit of the image from the first sample, and the image from the second sample including a matching regions that correspond to the plurality of regions in the image from the first sample; and
determining, by the processor, whether the image from the second sample is a counterfeit based upon an analysis of at least one of the matching regions that corresponds to the selected at least one of the plurality of regions without performing an analysis on non-selected ones of the plurality of regions.

10. The method of claim 9, wherein the plurality of regions is associated with a CIPA, and wherein the method further comprises comparing the CIPAs of the plurality of regions against a predetermined threshold to select said at least one of the plurality of regions.

11. The method of claim 9, wherein the CIPAs comprise clustering accuracy.

12. The method of claim 9, wherein the CIPAs comprise clustering behavior.

13. An apparatus comprising:
a computer readable non-transitory storage medium comprising instructions executable that when executed by a processor cause the processor to:
determine a first correlation result from a comparison of a first counterfeit identification performance attribute (CIPA) pertaining to a first region of a first image captured at a first resolution and a second CIPA pertaining to the first region captured at a second resolution;
determine a second correlation result from a comparison of a third CIPA pertaining to a second region of the first image captured at the first resolution and a fourth CIPA pertaining to the second region captured at the second resolution; and
identify which of the first correlation result and the second correlation result corresponds to a higher degree of correlation;
select, based upon the identification, one of the first region and the second region for use in determining whether a second image is a counterfeit;
access the image on the second sample, the image on the second sample including a first matching region that corresponds to the first region in the image on the first sample and a second matching region that corresponds to the second region in the image on the first sample; and
determine whether the image on the second sample is a counterfeit based upon an analysis of the one of the first matching region and the second matching region that corresponds to the selected one of the first region and the second region.

14. The method of claim 9, wherein capturing the corresponding selected at least one region of the image from the second sample comprises capturing the selected at least one region at the first resolution.

15. The apparatus of claim 13, wherein the computer readable non-transitory storage medium further comprises instructions that when executed by the processor cause the processor to: digitally capture the first region at a plurality of resolutions to select the first resolution.

16. The method of claim 1, wherein the first and second samples comprise a label associated with a product.

17. The apparatus of claim 13, wherein to determine whether the image on the second sample is a counterfeit, the computer readable non-transitory storage medium further comprises instructions that when by the processor cause the processor to:
determine whether the second image is a counterfeit without performing an analysis on the other one of the first matching region and the second matching region.

18. The apparatus of claim 13, wherein the computer readable non-transitory storage medium further comprises instructions that when by the processor cause the processor to:
determine a plurality of correlation results corresponding to multiple regions of the first image, wherein the multiple regions include the first region and the second region;
identify correlation results of the plurality of correlation results that satisfy a predefined threshold; and
select the first region and the second region from the regions corresponding to the identified correlation results that satisfy the predefined threshold.

* * * * *

UNITED STATES PATENT AND TRADEMARK OFFICE
CERTIFICATE OF CORRECTION

PATENT NO. : 9,977,987 B2  
APPLICATION NO. : 14/347254  
DATED : May 22, 2018  
INVENTOR(S) : Steven J. Simske et al.

Page 1 of 1

It is certified that error appears in the above-identified patent and that said Letters Patent is hereby corrected as shown below:

In the Drawings

Drawing sheet 3 of 4, FIG. 5, reference numeral 102, Line 4, delete "REOLUTION" and insert -- RESOLUTION --, therefor.

In the Claims

Column 9, Line 53, Claim 13, after "instructions" delete "executable".

Signed and Sealed this
Sixteenth Day of October, 2018

Andrei Iancu
*Director of the United States Patent and Trademark Office*